United States Patent [19]
Glaze, Jr.

[11] 3,806,009
[45] Apr. 23, 1974

[54] METHOD AND APPARATUS FOR HANDLING HOSIERY

[75] Inventor: John W. Glaze, Jr., Charlotte, N.C.

[73] Assignee: Intech Corporation, Charlotte, N.C.

[22] Filed: Aug. 18, 1972

[21] Appl. No.: 281,980

Related U.S. Application Data

[62] Division of Ser. No. 66,338, Aug. 24, 1970, Pat. No. 3,704,565.

[52] U.S. Cl. .................................................. 223/112
[51] Int. Cl. ............................................. A47j 51/06
[58] Field of Search ........... 223/43, 112, 74, 77, 76; 112/121.15, 121.29

[56] References Cited
UNITED STATES PATENTS

| | | | |
|---|---|---|---|
| 3,319,851 | 5/1967 | Horberg | 223/112 |
| 2,722,348 | 11/1955 | Ammon | 223/43 |
| 2,818,205 | 12/1957 | De Spain | 223/43 |
| 3,327,664 | 6/1967 | Bryan et al. | 223/112 X |
| 3,420,196 | 1/1969 | Edwards et al. | 223/112 X |
| 3,577,942 | 5/1971 | Hulin | 223/43 |
| 3,500,779 | 3/1970 | Jones et al. | 223/43 X |
| 3,471,068 | 10/1969 | Foreman | 223/74 X |
| 3,351,033 | 11/1967 | Kienel | 223/112 X |
| 3,231,158 | 1/1966 | Rossak | 223/76 |

FOREIGN PATENTS OR APPLICATIONS

| | | | |
|---|---|---|---|
| 1,186,679 | 2/1959 | France | 223/43 |

*Primary Examiner*—George H. Krizmanich

[57] ABSTRACT

A method and apparatus for loading hosiery articles on a form, shaping, inspecting and treating the articles on the form, and stripping the articles from the form. The hosiery forms extend upwardly from a plurality of bases carried by an endless conveyor chain through loading, inspection, treating and stripping stations. Each form is collapsible to facilitate loading and stripping. Loading is accomplished manually with the help of a vacuum assist loading mechanism that extends and suspends the hosiery articles in an air stream. The forms are expanded to shape the articles and to present the articles for inspection before a lighted panel. The articles are then treated while on the expanded forms. Finally, the forms are automatically collapsed at the stripping station and the articles stripped therefrom by air pressure and forced into the inlet of a pneumatic conveyor that moves the articles to stacking or packaging machines.

30 Claims, 10 Drawing Figures

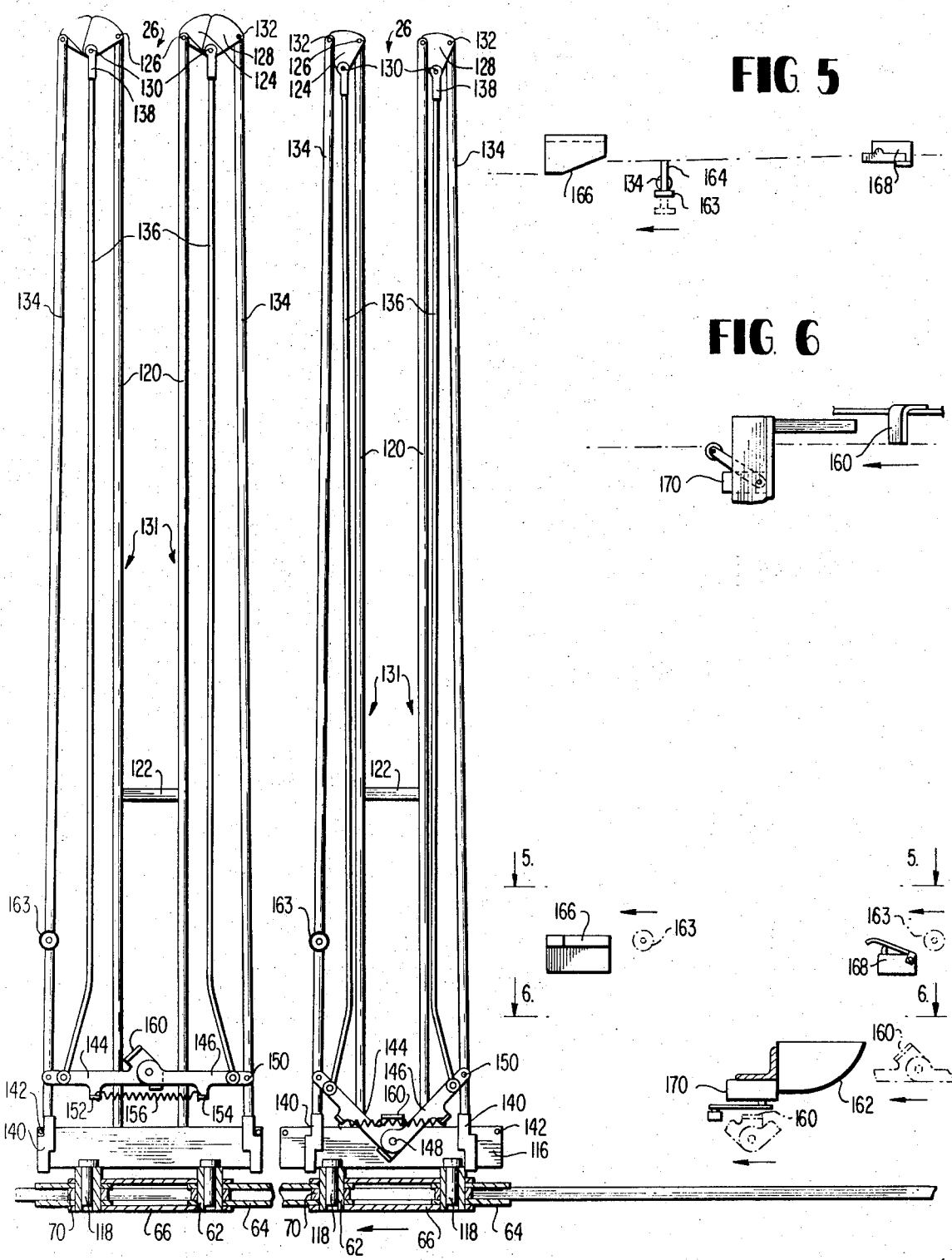

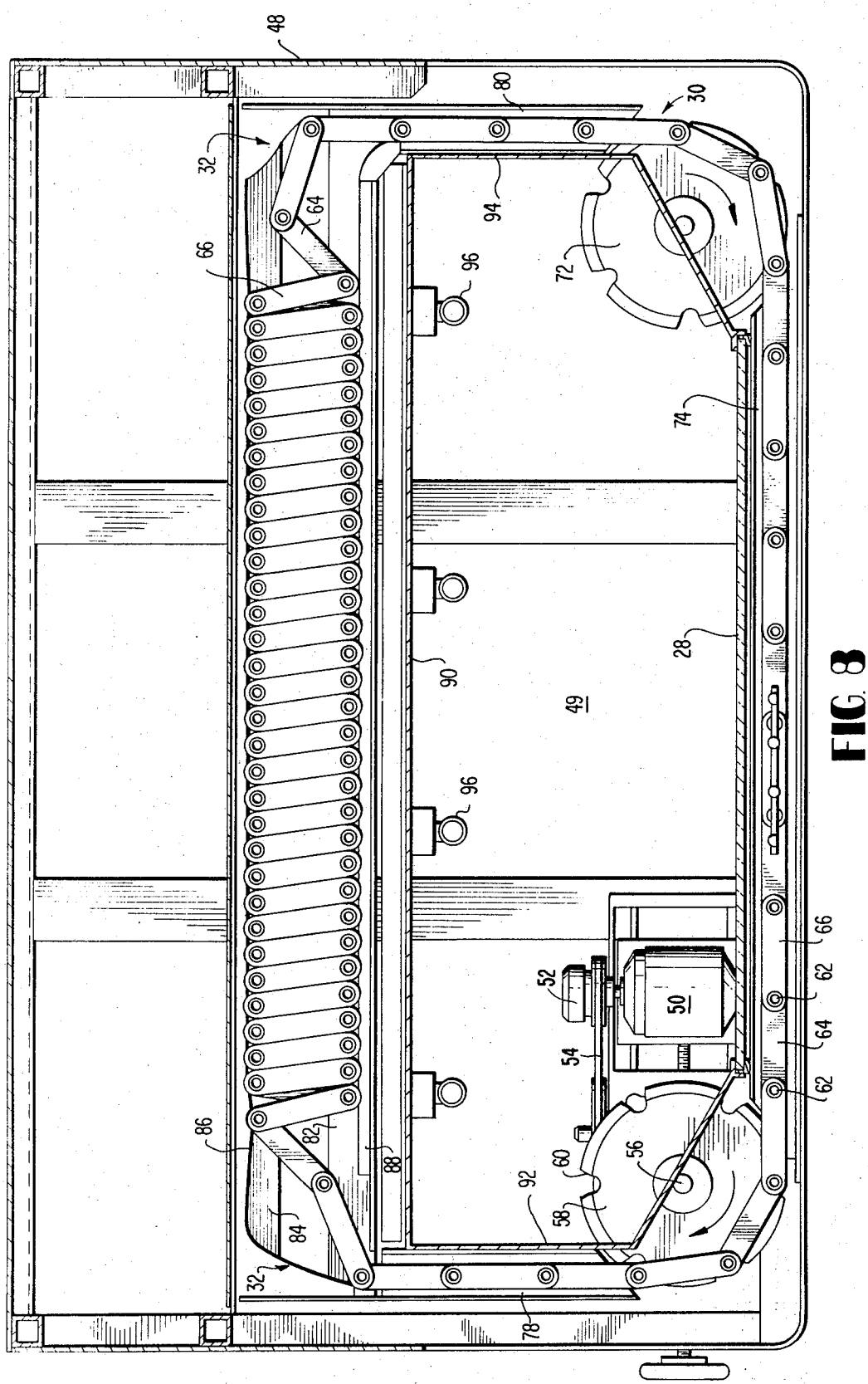

METHOD AND APPARATUS FOR HANDLING HOSIERY

RELATED APPLICATION

This is a division of application Ser. No. 66,338, filed Aug. 24, 1970 now U.S. Pat. No. 3,704,565.

BACKGROUND OF THE INVENTION

This invention relates to an improved method for use in the production and processing of hosiery articles, and to improved apparatus for use in carrying out the method. More particularly, the improved method and apparatus are especially useful in the processing of hosiery articles knit from synthetic, stretch yarn. While the invention is particularly well adapted to the processing of garments such as knit leotards, panty hose, tights, or the like, sometimes hereinafter referred to generally as panty hose or panty garments, the invention is not limited to use in the production of such garments, but rather may have general application in the production, handling and packaging of various articles. Thus, while the invention will be described herein with specific reference to stockings and panty garments, this reference is for convenience of description of a preferred embodiment only, and it is understood that the invention is not so limited.

The advent in recent years of the super-stretch, synthetic yarns has revolutionized the hosiery industry. Not only has this development made possible the reduction in the number of sizes of stockings produced, or the elimination of sizing entirely by the super-stretch, one-size-fits-all garment, but it also has resulted in many changes in the methods and procedures employed in the production, packaging and marketing of the garments.

The difficulties precipitated by the popularity of the stretch synthetic fibers employed in the production of hosiery were further complicated by the almost simultaneous increase in popularity of panty hose. Thus, the shift was, in effect, from the conventional, sized stocking to the super-stretch panty garment. While this shift has produced much speculation of increased automation and the accompanying reduction in cost, workable solutions to the obvious problems have not been readily apparent. For example, super-stretch garments must be treated, inspected, transferred and packaged in a manner that will not unduly stretch the garment. However, the articles must be flattened and shaped to such a degree as to be easily packaged, and so they present an attractive appearance to the purchaser upon removal from the package. Accordingly, it is a primary object of the present invention to provide an improved method and apparatus for use in the semi-automatic production and packaging of hosiery articles.

Another object is to provide an improved method and apparatus for straightening, inspecting, conveying and packaging stretch hosiery articles.

Another object is to provide an improved method and apparatus for loading panty hose onto boarding forms, inspecting the panty hose on the boarding forms, and for stripping the hose from the forms.

The foregoing and other objects are attained, in accordance with the present invention, in a system incorporating a semi-boarding apparatus upon which the garments are loaded for straightening, inspection and conveying through a treating chamber, and from which the garments are then stripped to be conveyed to stacking and/or packaging apparatus. The term "semi-boarding" is employed in this application to denote a process in which hosiery articles, including panty hose, are temporarily "boarded", or mounted on a boarding form for such time as it takes to straighten and flatten the article to eliminate excess wrinkles, to inspect the article, and to heat-treat the articles. The semi-boarding process is intended to shape, smooth and flatten the hosiery article, rather than to stretch, set and size the article, as in the conventional boarding process. Preferably, the semi-boarding form is a collapsible, open frame structure which is collapsed to facilitate loading the garments onto the form, then expanded to slightly stretch and shape the garment. Once expanded, the open frame form is passed before an illuminated screen or panel which permits a ready and efficient inspection of the garment before it passes into a treatment chamber where sufficient heat is applied to dry the damp garment, and to eliminate wrinkles and substantially set the garment to the smooth, flat shape of the form without relaxing the yarn sufficiently to materially affect its stretch qualities.

Upon leaving the treatment chamber, the collapsible form is automatically collapsed, and the treated garment is automatically stripped from the form by a pneumatic stripper and conveyor which conveys the treated article either to a stacking machine or to an automatic packaging machine.

BRIEF DESCRIPTION OF THE DRAWINGS

Other objects and advantages of the invention will become apparent from the following detailed description of the invention, taken with the drawings, in which:

FIG. 4 is an enlarged view of the collapsible boarding form, in the collapsed condition, employed in the semi-boarding apparatus of the invention, and illustrating a portion of the form conveyor and actuating mechanism of the semi-boarding apparatus;

FIG. 5 is a view taken on line 5—5 of FIG. 4;

FIG. 6 is a view taken on line 6—6 of FIG. 4;

FIG. 7 is a view of the boarding form shown in FIG. 4, illustrated in the expanded condition;

FIG. 8 is a plan view, in section, of the semi-boarding apparatus and illustrating the conveyor mechanism for moving the boarding forms about their endless path through the semi-boarding mechanism;

DESCRIPTION OF THE PREFERRED EMBODIMENT

In the manufacture of stretch panty hose from synthetic yarns, it is the conventional practice to knit the garment, either as a unitary structure (including the elastic waistband) or as separate components which are subsequently sewn together, from undyed yarns, and subsequently subjecting the undyed articles to shrinking and dyeing operations. An improved method and apparatus for shrinking and/or dyeing these garments is disclosed and described in copending U.S. Pat. application Ser. No. 847,692, assigned to the assignee of this invention, and the present invention is particularly well adapted for use in combination with the method and apparatus of that application, the present invention being especially useful for further processing of both panty hose and conventional stretch stockings processed in accordance with the teachings of that earlier copending application.

Figure 1:
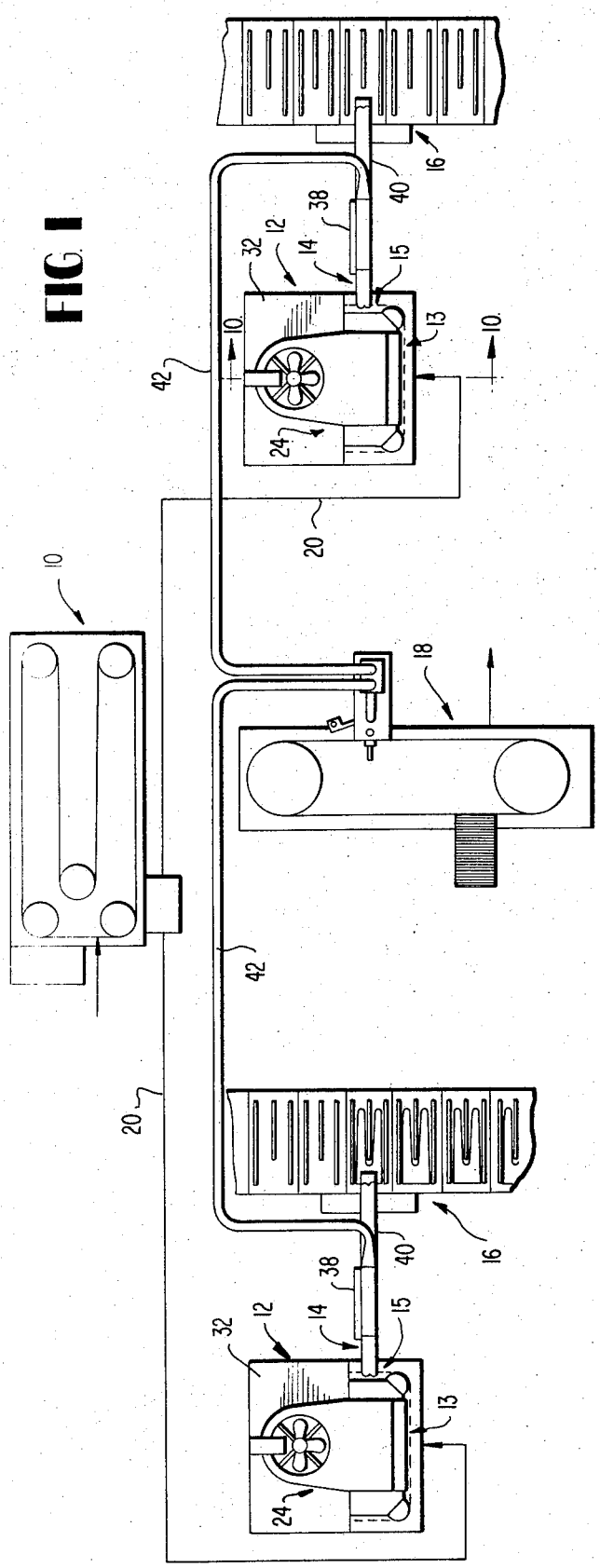
FIG. 1 is a plan view schematically illustrating a system for the production of panty hose incorporating the present invention.
Figure 2:
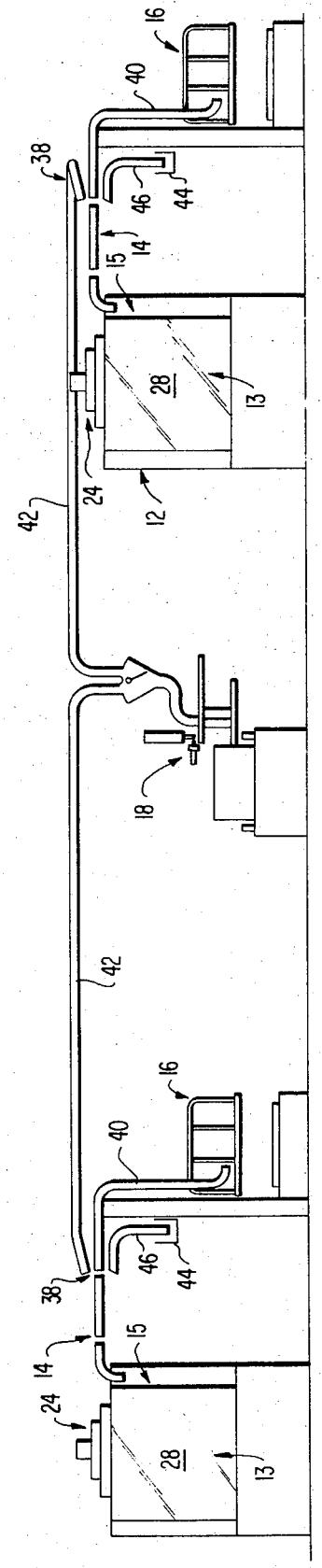
FIG. 2 is an elevational view of the system illustrated in FIG. 1.

Referring now to the drawings in detail, a shrinking and dyeing apparatus of the general type described in said application Ser. No. 847,692, indicated generally by the reference numeral 10, is illustrated in FIG. 1 as being incorporated in an integrated system for the production of panty hose, with the system including a pair of identical semi-boarding machines 12, each adapted to deliver semi-boarded panty hose to an improved conveyor system 14 for selective delivery either to a stacking apparatus 16 or to an automatic packing apparatus 18. The dyed shrunk garments, preferably in their damp, extracted condition, are conveyed individually through a pneumatic conveyor system indicated generally by the reference numeral 20 to the loading station 13 of each semi-boarding machine 12. The individual garments 22 are then loaded, with the aid of a vacuum assist loading device 24 on the top of the semi-boarding machine, onto collapsible, open frame semi-boarding forms 26 (see FIG. 3). After the garments are telescoped onto the collapsed forms 26, the form is expanded to slightly stretch the garments to flatten the legs and body portion and to remove any wrinkles therefrom. The expanded forms then pass before an illuminated inspection screen 28 to permit the loading operator to inspect the garments through the open-frame form for any defects.

After the panty hose have been inspected on the semi-boarding forms 26, the forms are conveyed by an endless chain 30 through a conventional treatment chamber 32 where heated air dries the garments 22 and tends to set them in their slightly expanded or stretched condition so that, when removed, the panty hose may be laid flat without excessive effort being required to straighten and remove wrinkles therefrom.

Leaving the treatment chamber 32 and continuing along their endless path, the semi-boarding forms 26 pass a stripping station 15 where the forms are automatically collapsed, as indicated in FIG. 4, to facilitate stripping. At stripping station 15, the forms 26 have their upper, toe ends positioned immediately beneath the inlet 34 of a pneumatic conveyor tube 36, and a flow of air is induced along the toes of form 26 to lift the toes of the panty hose and convey them into inlet 34 and strip the panty hose from the form.

The legs of the panty hose enter the conveyor 36 with one leg extending into each of the enlarged channels of the conveyor and with the body portion of the garment extending across the restricted portion thereof. The flow of air through the pneumatic conveyor tube 36 from the inlet 34 maintains the legs stretched out in their respective channels so that the legs remain separated and substantially smooth as they are conveyed through the pneumatic tube.

The pneumatic panty hose conveyor 36 contains a selector valve assembly 38 for selectively directing panty hose passing therethrough either to the stacking apparatus 16 through conduit 40, or to the packaging machine 18 through conduit 42, and for automatically shifting to direct defective garments to a collection bag 44 through conduit 46.

Referring now specifically to FIGS. 3 through 9, the boarding mechanism for loading panty hose onto the forms 26, and for inspecting, semi-boarding, and stripping panty hose from the forms will be described in detail.

The garments 22 are loaded onto collapsed boarding forms 26 at a loading station 13 and are then semi-boarded and inspected on the expanded boarding forms at an inspection station. Loading station 13 extends across a large portion of illuminated screen 28, so several operators can load the forms 26. Then, the garments are inspected and are passed through a treating chamber 32 and are finally stripped from the collapsed boarding forms 26 at stripping station 15. The basic boarding machine 12 is of the general type illustrated in greater detail in U.S. Pat. No. 3,054,542. The lower, base portion of the frame and cabinet assembly 38 serves as a housing for a drive assembly, including a drive motor 50, which acts through a clutch assembly 52 and belt 54 to drive the vertical shaft 56 of a main drive sprocket 58 having spaced notches 60 around its outer periphery for engaging the connector pins 62 of links 64, 66 of a conveyor chain 30. The base portion of the cabinet assembly 38 also houses a conventional blower assembly, not shown, which directs air upwardly over a steam coil assembly, also not shown, and into a treatment chamber 32 to treat panty hose on the forms 26 passing therethrough.

As shown in detail in FIG. 8, conveyor chain 30 is constructed of alternating inner links 64 and outer links 66, each made up of a pair of spaced, identical elongated plate members connected adjacent their ends by tubular pin members 62. Preferably, the lowermost plate of the outer link 66 is welded to a lower end of pin 62, and a cylindrical sleeve 70 (see FIGS. 4 and 7) positioned on pin 62 retains the plates of the inner link 64 in spaced relation. Sleeve 70 is preferably rotatable on pin 62 and acts as a bearing in contact with the drive sprocket 58 and with an idler sprocket 72.

The conveyor chain 30 is driven about an endless path defined in part by a channel shaped guide 74 extending across the front of the semi-boarding apparatus 12 between drive sprocket 58 located at the forward, left hand corner of the frame assembly, as viewed from the front, and the idler sprocket 72 mounted at the right front corner of the assembly by a vertical shaft 76. Similar channel-shaped guides 78,80 extend rearwardly along the sides of the cabinet assembly from the sprockets 58, 72, respectively into the treatment chamber 32.

The guideway extending through treatment chamber 32 is enlarged to a width substantially equal to the length of the respective chain links 64, 66 and is defined by a pair of horizontal supporting plates 82, 84 positioned beneath and supporting the respective ends of the conveyor chain links when in the folded condition indicated in FIG. 8. Also, a pair of guide plates 86,88 are positioned to engage the bearing sleeves 70 to fold the chain 30 upon itself and maintain the folded chain in a straight path so that alternate links 66 are positioned in side-by-side relation within the treatment chamber, with alternate pins 62 positioned on opposite sides (front to rear) of the treatment chamber as shown in FIG. 8. Conveyor chain 30 has an extended length which is substantially greater than the distance around its endless path through the semi-boarding apparatus 12 so that the excess length of chain 30 will be folded in the treatment chamber 32 as successive links enter the treatment chamber, and unfolded as successive links are pulled from the exit end of the chamber 32 by rotation of the drive sprocket 58. The links 64, 66 are pushed substantially transversely of their linear dimension through the treatment chamber 32 by successive incoming links in a manner well known in the art and illustrated, for example, by U.S. Pat. No. 2,487,354. Thus, the individual chain links 64, 66 travel at a first uniform speed along the chain path along the sides and front of the machine, and at a substantially slower uniform speed along the chain path through the treatment chamber 32 to give the panty hose loaded on forms 26 and carried by the chain 30 sufficient time in the treatment chamber 32 to complete the drying and treating process. The speed of the conveyor along the front or unfolded portion of its path is governed by the rate at which one or two operators can load and inspect the garments on the forms.

Figure 3:
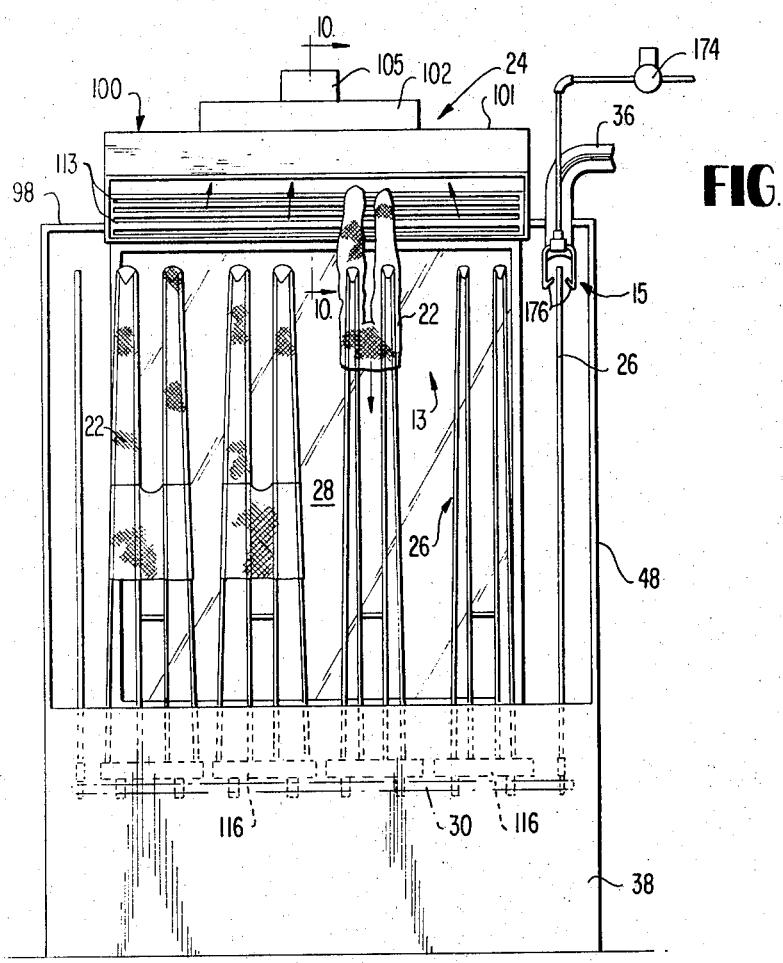
FIG. 3 is an enlarged plan view of the semi-boarding apparatus of the invention, in combination with a pneumatic conveyor and an automatic stacking apparatus.

As indicated in FIGS. 3 and 8, the upper portion of the cabinet assembly 48 forward of the treatment chamber 32 is defined by a rear wall 90 and opposed end walls 92, 94 of relatively thin metal material, and a forward wall of substantially translucent, light diffusing material 28. Preferably the inner surface of the metal walls 90, 92 and 94 is coated or polished so as to be light reflective, and a plurality of fluorescent light bars 96 are mounted on wall 90 so that light panel 28 appears as a substantially uniformly illuminated screen which permits the ready inspection of garments supported on the open-frame forms 26 passing closely in front of the screen on conveyor chain 30.

Figure 10:
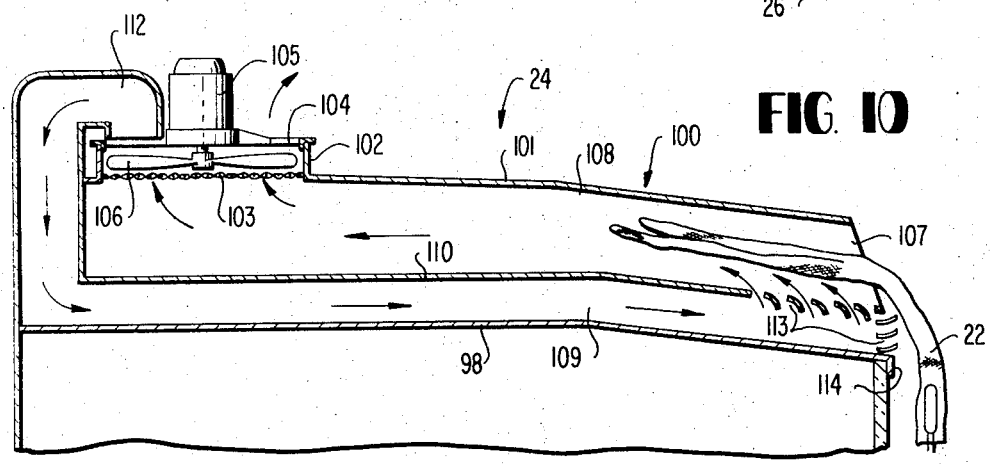
FIG. 10 is a sectional view taken on line 10—10 of FIG. 1.

The garments are manually loaded onto collapsed semi-boarding forms with the help of a vacuum assist loading mechanism indicated generally at 24 in FIGS. 1, 3 and 10. The vacuum assist loading mechanism 24 is mounted on the top wall 98 of the semi-boarding machine 12, and comprises a relatively thin, flat hollow housing 100 having an annular opening in the top wall 101 thereof near the back of housing 100, and a short, annular shroud 102 mounted within the opening and projecting upwardly therefrom. A screen 103 extends over the bottom open end of shroud 102, and a cross-frame 104 is mounted on the top end of the shroud. An electric motor 105 is mounted on frame 104 to drive an exhaust fan 106 to draw air through the open inlet 107. As best seen in FIG. 3, the open inlet 107 extends substantially the full width of light panel 28.

As best shown in FIG. 10, the interior of housing 100 is divided into an upper vacuum chamber 108 and a lower pressure chamber 109 by an intermediate wall 110 mounted between top wall 101 and the top wall 111 of frame 48. An air duct 112 is mounted on the back of housing 100 and has an open inlet extending above and directed downwardly toward the open top of shroud 102 to act as an air scoop in the airstream from fan 106. Duct 112 has its other end connected to chamber 109 to provide a slightly elevated pressure in chamber 109. Chamber 109 terminates in a plurality of adjustable louvers 113 adjacent the open inlet 107 of vacuum chamber 108 to provide an escape for the air scooped up and directed into the chamber 109 by duct 112. The air escaping from chamber 109 is so directed by louvers 113 as to provide an air cushion tending to lift a garment above the lower edge 114 of inlet 107.

In the loading operation, the operator grasps a panty hose garment 26 with both hands near the waistband, and holds it up in front of inlet 107. The legs of the garment are drawn into inlet 107 due to the action of fan 106. The induced flow of air through the open inlet 107 is at a velocity sufficient to straighten and draw the legs of the panty hose garment into the housing 100 when the body portion of the garment is held in the vicinity of the top of a collapsed semi-boarding form 26. The flow of air out of pressure chamber 109 through louvers 113 provides an air cushion that holds the garment out away from the lower edge 114 of the inlet 107. The garment 22 can then be drawn substantially straight down over the form 26 without making contact with the lower edge 114. As the panty hose 22 are drawn onto the form 26, from the top, the legs are held in an extended position above the top may the form 26 so that the panty hose can be telescoped directly onto the form 26 with a minimum of effort and without excessive or uneven stretching of any portion of the panty hose. 73

Inlet 107 is wide enough to permit several operators to work simultaneously as empty, collapsed semi-boarding forms 26 are continuously moved past the loading station. Once loaded, the forms 26 are expanded to permit inspection and treatment of the garments thereon, as explained below.

As best seen in FIGS. 4 and 7, the collapsible semi-boarding forms 26 each include a base 116, which preferably is in the form of a relatively thin metal bar or plate, having a pair of downwardly extending pins 118 rigidly welded on its bottom edge in position to fit into the open centers of adjacent ones of the tubular pin members 62 of chain 30. The length of the base 116 may be somewhat greater than the length of a single chain link, but is less than the length of two chain links so that a form may be mounted on each successive pair of pins 62 with base 116 remaining parallel to and spaced directly above one outer link 66 of the chain throughout its movement around the endless path through the boarding apparatus. Thus, adjacent base elements 116 on successive forms 26 are disposed in aligned, end-to-end relation as they move in front of inspection screen 28, and in parallel, side-by-side relation as they move through the treatment chamber 32.

A first pair of elongated, slender, flat rod, or wire members 120 have their lower ends rigidly fixed, as by welding, to the top edge of base 116 and project upwardly therefrom in spaced, generally parallel relation to one another. A short horizontal rod 122 extends between and is rigidly welded to rods 120 at a point above base 116 to strengthen and stiffen the fixed rods 120.

A first pair of expansion plates 124, each generally triangular shaped and having rounded corners, are pivotally connected at one of their rounded corners, as by pins 126, one to the top of each of the rigid bars 120. A second pair of similar expansion plates 128 each have one rounded corner pivotally connected, as by pins 130 to a second corner of the expansion plates 124, and also have a second rounded corner pivotally connected, as by pins 132, one to each of a pair of elongated, slender, flat rod members 134. A pair of elongated wire members 136 have one end pivotally connected to each of the pin members 130 as by a threaded clevis 138.

Bars 134 extend downwardly from their respective pivotal mounting pins 132 and terminate at their lower ends in a forked bracket 140 having one leg extending on each side of base 116 for sliding movement therealong. Movement of the fork 140 is limited in the direction toward rod 120 by the pins 118, and by the tubular pins 62, and in the direction away from rod 122 by a fixed pin 142 extending through and projecting outwardly from the sides of base 116. Vertical downward movement of rod 134 is limited by engagement of the fork with the top edge of base 116, while upward movement is limited by the expansion plates 124 and 128. Thus, rods 134 each cooperate with an adjacent rod 120 to define a pair of expansible and collapsible leg forms 131, each so dimensioned as to receive upon its upper portion one leg of a pair of panty hose. The lower portions of the leg forms 131 collectively receive the body of the panty hose garment. The expansion plates 124 and 128 cooperate to close the top end of the leg forms 131, and to extend upwardly and expand the toe of a garment positioned on the form 131 in the manner illustrated in FIGS. 4 and 7.

An over-center, spring-biased toggle structure is pivotally mounted on the lower ends of bars 134 to move them between the expanded position shown in FIG. 7 and the collapsed position shown in FIG. 4. The toggle structure includes a pair of elongated bars 144, 146 having their adjacent ends pivotally connected by a pin 148, and their opposed ends pivotally connected, as by pins 150, one to each of the movable rods 134. A pair of downwardly extending tabs 152, 154 are formed one on the respective bars 144, 146, and a coil spring 156 has its opposed ends connected to these tabs 152, 154 to resiliently urge them toward one another. Since spring 156 is disposed to one side of pin 148 when bars 144, 146 are in substantially aligned position as shown in FIG. 7, the toggle will be retained in this over-center condition until forcibly deflected to position the pin 148 beneath the line of action of spring 156, at which time the spring will urge the toggle to the collapsed condition shown in FIG. 4. A tab 158 limits movement of the bars 144, 146 in the upward direction, and a cam 160 is provided to engage a mating cam surface 162 mounted on the frame 48 in position to automatically push the toggle over-center and collapse the form 26 as the form approaches the stripping station 15 following its exit from the treatment chamber 32. Wires 136 each have their lower ends pivotally connected to one of the toggle bars 144, 146, in spaced relation to its associated rod 134 to move pin 130 in a vertical direction to collapse and expand the toe of the form 131, through the pivoted expansion plates 124, 128, in response to a movement of the over-center toggle arrangement.

From the above, it is seen that each of the movable rods 134 remains generally parallel, though slightly inclined, with respect to its associated rod 120 to provide a flat, substantially straight, slightly tapered leg form 131. Such forms 131 are intended primarily to smooth and flatten the panty hose rather than to stretch and set the hose as in a conventional boarding operation.

A reject button 163 is mounted on the leading rod 134 of each form 26. This reject button is in the form of a headed pin 164 (see FIG. 5) supported for axial movement between an extended and a retracted position through an opening in the bar 134. Preferably the pin 164 is retained in the retracted or extended position by a detent, not shown, and is manually movable to the reject position to automatically actuate a switch 168, upon movement of the form 26 through the semi-boarding apparatus, to condition the pneumatic conveyor switching mechanism 38 to direct a defective garment to a reject collecting bag 165 via conduit 167. A cam 166 mounted on frame 48 automatically returns the reject button 163 to the retracted position before the next garment is positioned on the form.

Figure 9:
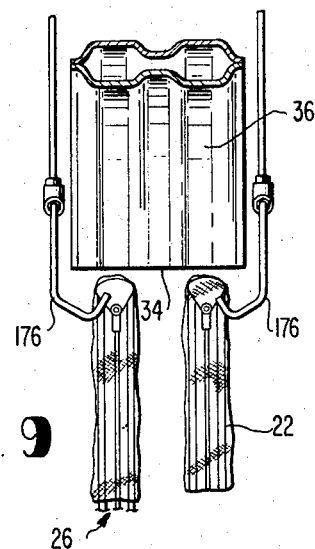
FIG. 9 is a fragmentary sectional view illustrating a portion of the pneumatic stripping and conveying mechanism.

As the semi-boarding forms 26 leave the treatment chamber 32 and proceed along the portion of the endless path defined by the guide channel 80, they pass by a stripping station 15 in which the toe portions of the respective legs of each form 26 are positioned directly beneath the open end 34 of vacuum conveyor tube 36 (see FIGS. 3 and 9). Prior to reaching stripping station 15, cam 160 has engaged and been deflected downwardly by cam surface 162 to collapse the boarding form 26 to the condition shown in FIG. 4, thereby leaving the finished, treated panty hose 22 hanging loosely on the collapsed form 26. As the form 26 reaches the position shown in FIG. 9, cam 160 engages limit switch 170 which energizes a solenoid valve 174, to direct jets of high pressure air through air jets 176 upwardly along the toe portion of the forms 26 to strip a pair of panty hose 22, toes first, from the collapsed form and direct them into the open inlet 34. This high pressure air directed into the conveyor tube 36 will convey the lightweight garments 22 through the tube 36 for a substantial distance without aid of other means. For longer conveying distances, and to provide a more positive control of the garments during stripping, a vacuum may be applied to the conveyor conduit 36 to assist the airjets 176. Alternatively, the air jets 176 may be eliminated and vacuum alone relied on to strip and convey the garments.

Once the toes of the panty hose are inside the conveyor conduit 36, the flow of air caused by the jets 176 directed into the tube will continue the stripping action to quickly strip the panty hose from the form 26 even as the form continues its movement along its endless path. This stripping action is very rapid and is normally substantially complete before the legs 131 are moved from beneath the conveyor inlet 34. As the garment advances into the conveyor conduit 36, the body portion enters the open end 34 and the legs extend into each of the enlarged channels of the conduit.

As the form 26 leaves stripping station 15, reject pin 164 passes cam surface 166 and, if it has been depressed as illustrated in FIG. 5, will be cammed back to the normal position before receiving another garment 22 to avoid the possibility of an operator inadvertently failing to reset the reject button 163 and thereby direct a good garment to the reject bag 44.

Initially, the panty hose garments 22 are received at the loading station 13 at the front of the semi-boarding machine 12 where they are manually loaded on the forms 26 moving across the front of the machine on chain 30 in front of inspection screen 28. The garments may be delivered individually as through conveyor 20 from the shrinking and dyeing apparatus 10, or in groups in bags or stacks from prior operations. An operator, standing in front of the loading station 13, picks up a pair of panty hose 22 and, holding onto the elastic waistband at the top, flips the garment up in front of the inlet 107 of the vacuum assist loading device 24. The flow of air into the opening 107 will quickly draw the legs of the damp garment 22 into the vacuum chamber 108 to straighten the garment out from the operator's hands.

The operator then positions the open top of the garment 22 over the toe portions of the form 26 and commences to draw the garment downward to telescope it onto the form. Pressure air flowing out of chamber 109 through louvers 113 balloons the garment 22 up and out from the lower edge 114 of entrance 107 and tends to keep the portion of the garment which extends into chamber 108 suspended in the airstream. This not only reduces the force required by the operator to draw the damp garment from the vacuum chamber 108, but more importantly tends to direct the garment straight down onto the top of the form 26, thereby eliminating the normal uneven stretching of the garment as it is drawn onto the form.

With the panty hose drawn fully down on the collapsed forms 26 so that the toes of the garment engage the expansion plates 124, 138, the operator grasps the two rods 134 at a point below the garment and pulls the rods away from one another to slightly stretch the garment and move the toggle structure to its over-center position to retain the form 26 in the expanded condition as shown in FIG. 7. This movement pivots the expansion plates 124, 128 up and out to expand and form the toe portions of the garment.

Since the plane of the semi-boarding forms 26, when moving along the front of the machine, is parallel to and spaced closely in front of the illuminated inspection screen 28, the loading operator can readily and quickly visually inspect the boarded garments for defects, through the open-frame form, as soon as the form is expanded. If the garment is found to be free of defects, no action is required by the operator. If a defect is detected, the operator simply depresses the reject button 163 and the treated garment will automatically be directed to the reject collecting bag 44. Since the operator does not have to remove the defective garment from the form before it passes into the treatment chamber 32, a more reliable inspection is normally achieved.

As can be seen from FIG. 3, the inspection screen 28 is of sufficient width to permit two operators to load and inspect panty hose on the apparatus. This feature, in combination with the vacuum assist loading, permits the semi-boarding apparatus to be operated at a very high rate.

In the embodiment of the semi-boarding apparatus shown in FIGS. 3 through 9, limit switch 170 is mounted on frame 48 in position to be engaged and have its normally open contacts closed by successive boarding forms 26 moving into the stripping position. Closing switch 170 energizes solenoid valve 174 to direct air under pressure from the conduits 176 to thereby direct a flow of air along the form 26 at the stripping position to strip a pair of panty hose from the collapsed form 26. Before reaching the stripping station 15 cam 160 has, of course, been deflected downward by cam surface 162 to collapse the form 26. Also, if reject button 163 has been manually actuated to indicate that the panty hose on the form are defective, the protruding pin 164 will have engaged and momentarily closed the normally open contacts of reject switch 168, thereby signalling the conveyor system. In response to such a signal the conveyor system selector valve assembly 38 directs the rejected garment to reject bag 44. As the collapsed boarding form 26 moves beyond the stripping station 15 the reject pin 164 engages cam surface 166 and is automatically cammed back to its normal position. The acceptable panty hose garments stripped from the collapsed loading forms 26 will be transported by the conduits 40 to stacking or packaging machines.

Many variations and modifications of the preferred embodiment may become apparent to those skilled in the art. However, it should be understood that the invention is not to be limited to the specific embodiment described above, but is defined only by the scope of the appended claims.

I claim:

1. A hosiery handling apparatus comprising a plurality of elongated hosiery forms having free ends, conveyor means for moving said forms about an endless path successively past a loading station and a stripping station at which hosiery articles are respectively loaded onto said forms and stripped therefrom, said conveyor means holding said forms in generally vertical position at said loading station, creating a flow of air along said forms at said stripping station at a velocity sufficient to pneumatically strip the hosiery articles from said forms, and means for creating a flow of air in a direction outwardly away from said free ends at said loading station at a velocity sufficient to suspend a hosiery article positioned in said outwardly directed flow of air to pneumatically straighten and support the articles above the top of said forms to thereby assist in drawing the articles onto said forms.

2. The hosiery article handling apparatus as defined in claim 1 wherein said means for creating a flow of air along said forms comprises means for directing jets of pressure air along said forms in the direction of said free ends.

3. The hosiery article handling apparatus defined in claim 2 further comprising conveyor conduit means at said stripping station having an open inlet adjacent said free ends, said flow of air extending along said forms and into said open inlet to deliver the stripped articles into said open inlet.

4. The hosiery article handling apparatus as defined in claim 1 wherein said means for creating a flow of air along said forms comprises means for creating a vacuum adjacent said free ends to thereby create a flow of air along said forms, to draw said hosiery articles from said forms.

5. The hosiery article handling apparatus as defined in claim 4 further comprising pneumatic conveyor conduit means at said stripping station having an open inlet adjacent said free ends, said means for creating a vacuum drawing air through said open inlet to thereby create a flow of air along said forms to draw said hosiery articles into said open inlet.

6. The hosiery article handling apparatus as defined in claim 1 wherein said forms are collapsible to facilitate loading of hosiery articles thereon and stripping of the articles therefrom, said apparatus further comprising means for collapsing said forms at said stripping station.

7. The hosiery article handling apparatus as defined in claim 1 further comprising an illuminated inspection screen adjacent said forms at said loading station whereby hosiery articles loaded on said forms may be visually inspected before being moved from said loading station.

8. The hosiery article handling apparatus as defined in claim 1 wherein each of said forms comprises a pair of spaced leg portions each adapted to simultaneously receive one leg of a hosiery article loaded onto said form.

9. A hosiery article handling apparatus comprising at least one elongated hosiery form having a free end for receiving hosiery articles loaded thereon at a loading station by telescoping the articles over said free end, and means at said loading station creating an air flow in a direction outwardly away from said free end of said forms at a velocity sufficient to extend a hosiery article held at said free end outwardly of said free end whereby the article may be drawn directly from said air flow onto said form.

10. The hosiery article handling apparatus defined in claim 9 wherein said means creating said air flow comprises a hollow chamber having edges defining an elongated opening therein extending along said loading station adjacent to said free ends of said forms, and means creating a flow of air into said chamber through said elongated opening.

11. The hosiery article handling apparatus defined in claim 10 wherein said means creating said flow of air into said chamber comprises means for drawing air from said chamber at a point spaced from said inlet.

12. The hosiery article handling apparatus defined in claim 11 wherein said hollow chamber extends from said elongated opening in a direction making a substantial angle with respect to the longitudinal axis of said forms at said loading station, and further comprising means directing a flow of air under pressure outwardly from said elongated opening adjacent to one of the said edges around which said hosiery article extends during loading onto said form to establish an air cushion between said hosiery article and said one edge.

13. The hosiery article handling apparatus as defined in claim 12 wherein said hollow chamber has a first side terminating in said one edge, said first side having pressure air openings adjacent to said one edge through which said flow of air under pressure is directed.

14. The hosiery article handling apparatus as defined in claim 13 wherein said means for drawing air from said chamber comprises fan means, and further comprising a pressure air supply duct communicating with said pressure air openings and the discharge side of said fan means whereby discharge air under pressure from said fan means is supplied to said pressure air duct.

15. The hosiery article handling apparatus of claim 14 wherein said pressure air duct terminates in an end wall making a substantial angle with said first side, said end wall having second pressure air openings.

16. The hosiery article handling apparatus defined in claim 9 wherein said hosiery forms are supported in a generally upright position with said free ends extending upwardly.

17. The hosiery handling apparatus defined in claim 9 wherein said hosiery forms are adjustable between a collapsed and an expanded position to further facilitate loading said hosiery articles, said apparatus further comprising means for moving said hosiery forms between said collapsed and expanded positions.

18. The hosiery handling apparatus defined in claim 9 wherein said hosiery forms each comprises a base, first and second elongated members, means mounting said first and said second elongated members in generally parallel spaced relation on said base and for translational movement relative to one another between an expanded and a collapsed position, and means for releasably retaining said elongated members in said expanded position.

19. The hosiery handling apparatus defined in claim 18 further comprising means normally resiliently urging said elongated members toward said collapsed position.

20. The hosiery handling apparatus defined in claim 9 further comprising a conveyor means for moving said forms along a fixed path from said loading station to a stripping station, and stripping means at said stripping station for stripping said hosiery articles from said forms.

21. In a system for treating hosiery articles in which successive articles are treated while mounted on elongated boarding forms of open frame construction and subsequently stripped from the forms at a stripping station, the improvement comprising the steps of passing said forms with hosiery articles mounted thereon before an illuminated inspection panel, visually inspecting said hosiery articles through said open frame forms prior to passing said hosiery articles into a treatment chamber, creating a flow of air along said forms toward the end of a conveyor means at said stripping station to pneumatically strip and convey the treated hosiery from said forms to the end of said conveyor means, and conveying the treated hosiery from said end of said conveyor means.

22. In a system for treating hosiery articles as defined in claim 21, wherein said boarding forms are collapsible, the further improvement comprising the step of collapsing said hosiery forms to facilitate stripping said hosiery articles therefrom by said flow of air.

23. In a system for treating hosiery articles as defined in claim 21, the further improvement comprising the steps of mounting said hosiery articles on said forms at a loading station while said forms are collapsed, and subsequently expanding said forms.

24. In a system for treating hosiery articles in which the articles are loaded on boarding forms having free ends by telescoping the articles thereover at a loading station and conveying the articles on the forms through a treatment chamber and subsequently stripping the articles from the forms at a stripping station, the improvement comprising the steps of creating a stream of air flowing along said boarding forms toward said free ends at said loading station, suspending said articles in said stream of air, and drawing said articles downwardly from said stream of air onto said forms at said boarding station.

25. The system for treating hosiery articles as defined in claim 24, wherein said boarding forms are of open frame construction, the further improvement comprising the steps of passing said boarding forms in front of an illuminated inspection screen, and visually inspecting the hosiery articles through said open frame form as said form passes in front of said inspection screen.

26. In the system for treating hosiery articles as defined in claim 24, the further improvement comprising the step of stripping the hosiery articles from said forms at said stripping station and conveying the stripped articles, toes first, from said stripping station for further processing.

27. In the system for treating hosiery articles as defined in claim 24, wherein said boarding forms are adjustable between a collapsed position and an expanded position, the further improvement comprising the steps of collapsing said boarding forms at said stripping station to facilitate stripping of the treated articles from the forms by said flow of air.

28. In the system for treating hosiery articles as defined in claim 27, further improvement comprising the steps of mounting said hosiery articles on said forms at said loading station while said forms are collapsed, and subsequently expanding said forms before inspecting the hosiery article mounted thereon in front of said illuminated inspection panel.

29. In the system for treating hosiery articles as defined in claim 24, wherein said boarding forms are adjustable between a collapsed position and an expanded position, the further improvement comprising the step of collapsing said boarding forms at said loading station to facilitate loading of said articles by said stream of air.

30. In the system for treating hosiery articles as defined in claim 24, the further improvement comprising the steps of orienting the direction of the said stream of air at a substantial angle to the boarding forms and creating a second stream of air generally toward the free ends of said boarding forms within the angle included by said stream of air and said boarding forms to support the hosiery articles as said hosiery articles are being drawn at an angle from said stream of air onto said boarding forms.

* * * * *